(12) United States Patent
Hirakawa et al.

(10) Patent No.: US 11,511,430 B2
(45) Date of Patent: Nov. 29, 2022

(54) ROBOT CONTROLLER AND MANAGEMENT SYSTEM

(71) Applicant: FANUC CORPORATION, Yamanashi (JP)

(72) Inventors: Manabu Hirakawa, Yamanashi (JP); Tsuyoshi Hannya, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 279 days.

(21) Appl. No.: 16/746,164

(22) Filed: Jan. 17, 2020

(65) Prior Publication Data

US 2020/0238522 A1 Jul. 30, 2020

(30) Foreign Application Priority Data

Jan. 25, 2019 (JP) .............................. JP2019-011350

(51) Int. Cl.
*B25J 9/16* (2006.01)

(52) U.S. Cl.
CPC ........... *B25J 9/1674* (2013.01); *B25J 9/1694* (2013.01)

(58) Field of Classification Search
CPC ...... B25J 9/1674; B25J 9/1694; B25J 9/0093; B25J 9/1684; B25J 9/1664; B25J 9/1669; B25J 9/1687; B25J 9/1697; B25J 13/006; B25J 19/021; B25J 19/022; B25J 19/023; B25J 13/088; G05B 2219/37563; G05B 2219/37572; G05B 2219/39102; G05B 2219/39107; G05B 19/41815; G05B 19/4182; G05B 2219/39104; G05B 2219/39106; G05B 2219/40554; B65G 47/917; B65G 2203/04
See application file for complete search history.

(56) References Cited

U.S. PATENT DOCUMENTS

| | | | | |
|---|---|---|---|---|
| 5,521,830 A | * | 5/1996 | Saito | B23Q 7/007 700/192 |
| 2010/0017033 A1 | * | 1/2010 | Boca | B25J 13/06 700/258 |
| 2018/0333849 A1 | * | 11/2018 | Sugio | B25J 9/1664 |

(Continued)

FOREIGN PATENT DOCUMENTS

| | | | | |
|---|---|---|---|---|
| EP | 2159657 B1 | * | 10/2017 | ............ B25J 9/0093 |
| JP | S62203206 A | | 9/1987 | |

(Continued)

OTHER PUBLICATIONS

Japanese Notice of Reasons for Refusal dated Mar. 16, 2021, for Japanese Patent Application No. 2019011350.

*Primary Examiner* — Abby Y Lin
*Assistant Examiner* — Esvinder Singh
(74) *Attorney, Agent, or Firm* — Karceski IP Law, PLLC

(57) ABSTRACT

This robot controller causes a robot to follow a target, while a transfer device moves the target, by using a detection result obtained by a movement-amount detecting device that detects the amount by which the transfer device moves the target. When the value of any one of the speed, the acceleration, and the jerk of the target calculated based on the detection result obtained by the movement-amount detecting device or the pattern of the speed, the acceleration, and the jerk deviates from the predetermined reference, the robot controller performs predetermined reporting or stops the robot.

1 Claim, 8 Drawing Sheets

(56) References Cited

U.S. PATENT DOCUMENTS

| | | | |
|---|---|---|---|
| 2018/0370023 A1 | 12/2018 | Ooba | |
| 2019/0077010 A1* | 3/2019 | Ando | B25J 9/1664 |
| 2019/0118383 A1* | 4/2019 | Yoshiura | B25J 9/1697 |
| 2021/0269187 A1* | 9/2021 | Poeschl | B65G 47/52 |

FOREIGN PATENT DOCUMENTS

| | | |
|---|---|---|
| JP | 2000006069 A | 1/2000 |
| JP | 2007112565 A | 5/2007 |
| JP | 2012236692 A | 12/2012 |
| JP | 2018192579 A | 12/2018 |
| JP | 2019005856 A | 1/2019 |

* cited by examiner

ROBOT CONTROLLER AND MANAGEMENT SYSTEM

CROSS-REFERENCE TO RELATED APPLICATIONS

This application is based on and claims priority to Japanese Patent Application No. 2019-011350, filed on Jan. 25, 2019, the content of which is incorporated herein by reference in its entirety.

FIELD OF THE INVENTION

The present invention relates to a robot controller and a management system.

BACKGROUND OF THE INVENTION

In a known robot system in the related art, a robot follows an object that is being transferred by a transfer device in a state in which the object is being transferred by the transfer device, and by doing so, the robot picks the object (for example, see Japanese Unexamined Patent Application Publication No. 2000-6069).

In a known transfer device, a theoretical value and an actual measurement value of driving for the transfer are compared, and a warning is performed on the basis of the comparison result (for example, see Japanese Unexamined Patent Application Publication No. 2007-112565).

SUMMARY OF THE INVENTION

According to an aspect of the present disclosure, there is provided a robot controller that causes a robot to follow a target, while a transfer device is moving the target, by using a detection result obtained by a movement-amount detecting device that detects an amount by which the transfer device moves the target, wherein the robot controller performs predetermined reporting or stops the robot when a value or a pattern of at least one of a speed, an acceleration, and a jerk of the target calculated based on a detection result obtained by the movement-amount detecting device deviates from a predetermined reference.

DESCRIPTION OF EMBODIMENT(S) OF THE INVENTION

A robot system 1 according to an embodiment will be described below using the drawings.

Figure 1:
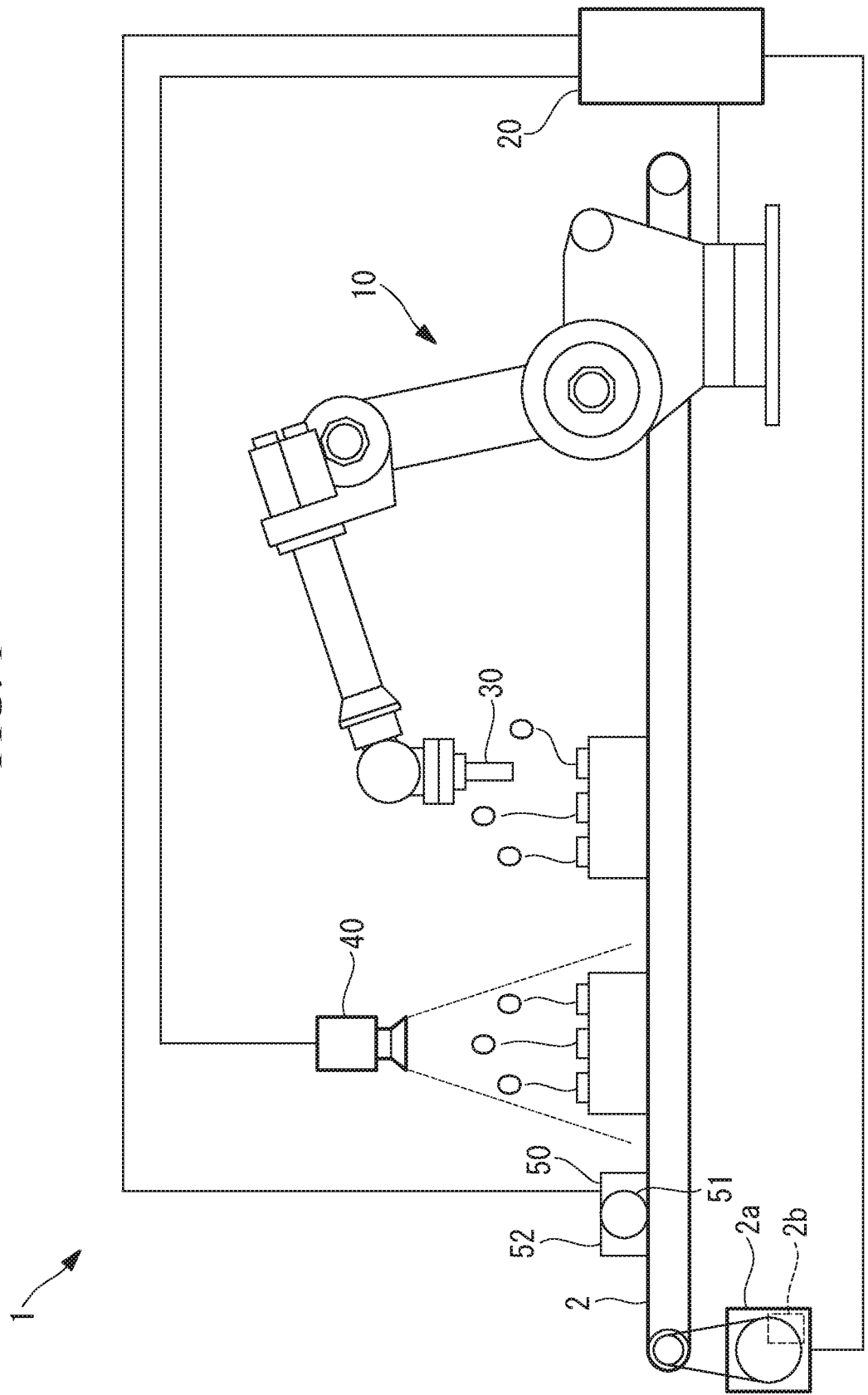
FIG. 1 schematically shows the configuration of a robot system according to an embodiment.
Figure 2:
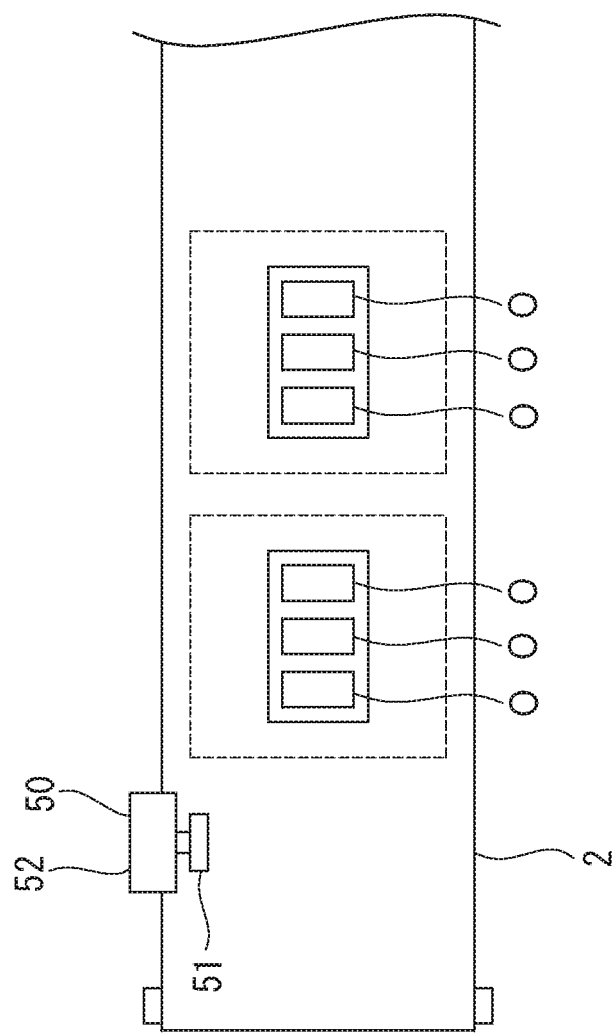
FIG. 2 is a plan view of the relevant part of the robot system according to this embodiment.

As shown in FIGS. 1 and 2, the robot system 1 according to this embodiment includes: a transfer device 2 that transfers an object (target) O, serving as a work target; a robot 10 that performs predetermined work on the object O transferred by the transfer device 2; a robot controller 20 that controls the robot 10; and a detecting device 40.

The detecting device 40 obtains data with which the position and the orientation of the object O transferred by the transfer device 2 can be identified. Any device that has such a function can be used as the detecting device 40. Examples of the detecting device 40 include a two-dimensional camera, a three-dimensional camera, a three-dimensional distance sensor, and a sensor that measures the shape of a target object by radiating a line of light thereon. The detecting device 40 in this embodiment is a two-dimensional camera attached to the upper part of the transfer device 2. The detecting device 40 transmits detected image data to the robot controller 20. The image data is data with which at least the position of each object O can be identified. The image data may be data with which the position and the orientation of the object O can be identified.

Although the object O is not limited to one of a specific type, in this embodiment, the object O is, for example, a work piece. The transfer device 2 transfers the object O in a predetermined direction by driving a motor 2a. In this embodiment, the transfer device 2 transfers the object O toward the right side in FIG. 1.

The robot system 1 includes a movement-amount detecting device 50 that detects the amount by which the transfer device 2 moves the object O. The movement-amount detecting device 50 includes a roller 51 in contact with the transfer device 2 and a rotation meter 52 that detects the amount of rotation of the roller 51 by using a known device, such as an encoder. In this case, the amount of rotation of the roller 51 is associated with the amount of movement of the transfer device 2.

The motor 2a may include an operation-position detecting device (movement-amount detecting device) 2b, and the operation-position detecting device 2b may sequentially detect the rotation position and the amount of rotation of the output shaft of the motor 2a. In such a case, the amount of rotation of the output shaft of the motor 2a is associated with the amount of movement of the transfer device 2. The operation-position detecting device 2b is, for example, an encoder. A detection value obtained by the movement-amount detecting device 50 or the operation-position detecting device 2b is transmitted to the robot controller 20.

The object O is a target on which the robot 10 performs predetermined work. In this embodiment, the robot 10 performs, as the predetermined work, picking the object O, moving the object O to a predetermined place, fitting the object O to a predetermined part, or the like.

The robot 10 performs the above-described work on the object O in a state in which the object O is being moved by the transfer device 2.

When the robot 10 performs predetermined work, such as machining, welding, measurement, or burr removal, on an object that is a frame or the like, a work portion in the frame serves as the target.

Figure 3:
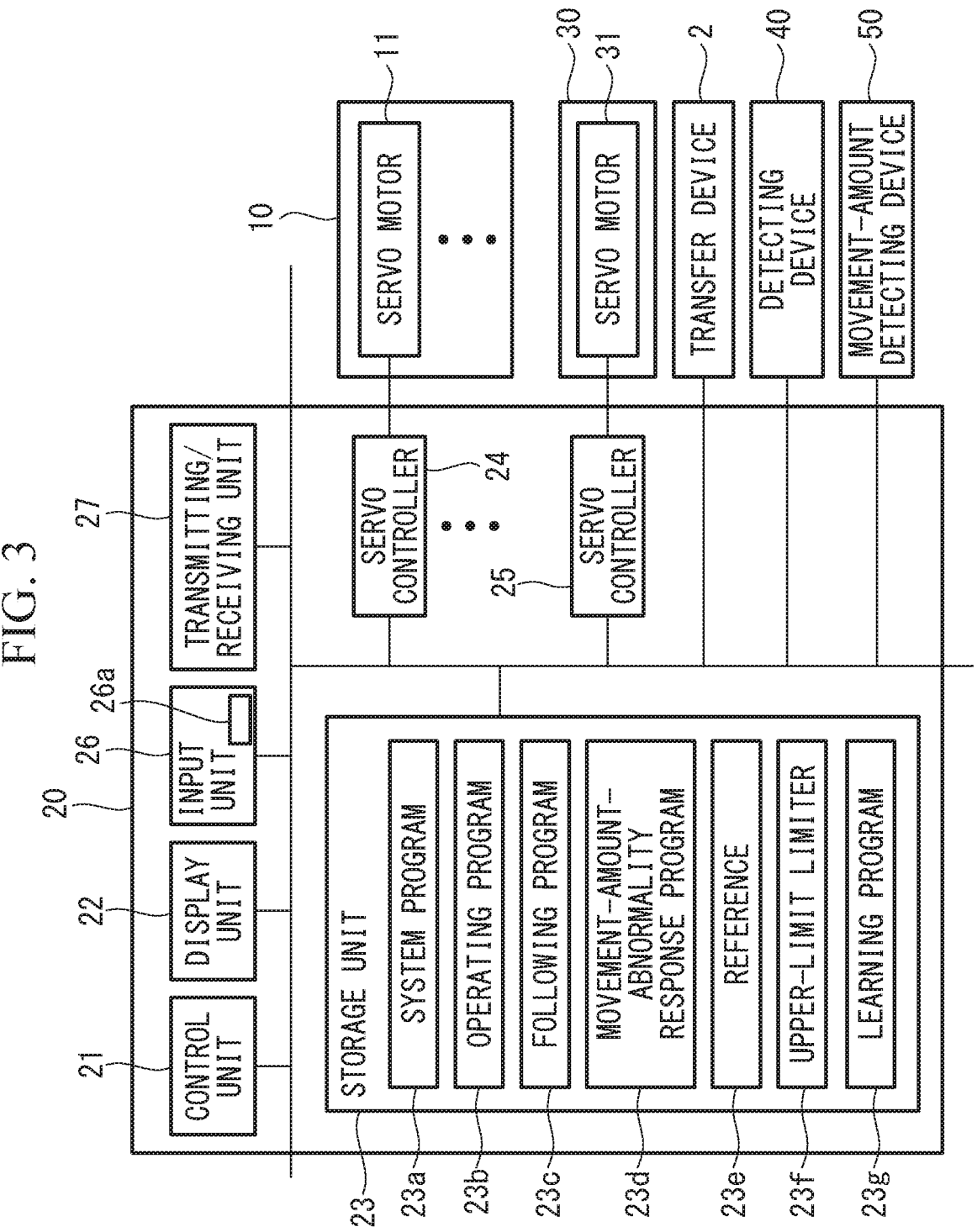
FIG. 3 is a block diagram of a robot controller of the robot system according to this embodiment.

Although the robot 10 is not limited to one of a specific type, the robot 10 according to this embodiment includes a plurality of servo motors 11 that respectively drive a plurality of movable parts (see FIG. 3). Each servo motor 11 has an operation-position detecting device for detecting the operation position thereof, and an example operation-position detecting device is an encoder. The detection value obtained by the operation-position detecting device is transmitted to the robot controller 20.

A hand 30 is attached to the distal end of the robot 10. Although the hand 30 in this embodiment supports the object O by grasping the object O with a plurality of claws, it is also possible to use a hand that supports the object O using magnetic force, air suction, or the like.

The hand 30 includes a servo motor 31 for driving the claws (see FIG. 3). The servo motor 31 has an operation-position detecting device for detecting the operation position thereof, and an example operation-position detecting device is an encoder. The detection value obtained by the operation-position detecting device is transmitted to the robot controller 20.

Various types of servo motors, such as a rotation motor and a linear motor, can be used as the servo motors 11 and 31.

As shown in FIG. 3, the robot controller 20 includes: a control unit 21 including a CPU, a RAM, and the like; a display unit 22; a storage unit 23 including a nonvolatile storage, a ROM, and the like; a plurality of servo controllers 24 corresponding to the respective servo motors 11 of the robot 10; a servo controller 25 corresponding to the servo motor 31 of the hand 30; an input unit 26 connected to the robot controller 20; and a transmitting/receiving unit 27. In an example, the input unit 26 is an input device, such as a control panel or the like, that can be carried by an operator. The input unit 26 also has a display unit 26a. The input unit 26 may be a touch-screen input device. The input unit 26 may perform wireless communication with the robot controller 20.

The storage unit 23 stores a system program 23a, and the system program 23a implements basic functions of the robot controller 20. The storage unit 23 also stores an operating program 23b. The storage unit 23 also stores a following program 23c and a movement-amount-abnormality response program 23d.

Figure 4:
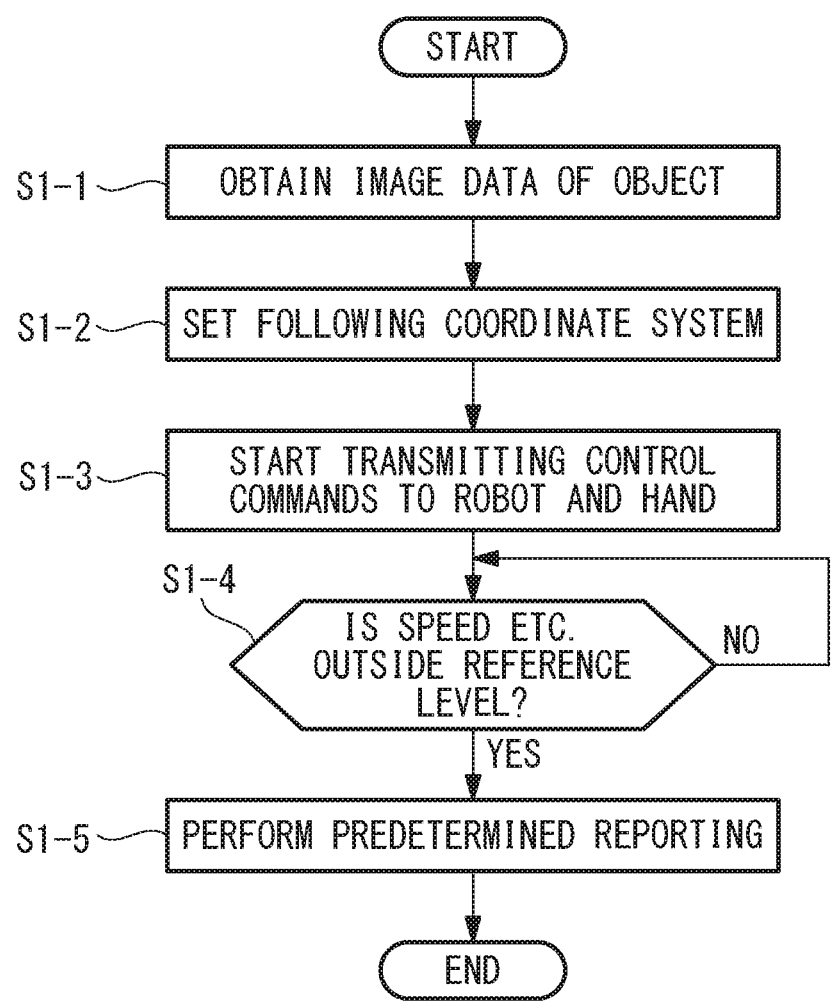
FIG. 4 is a flowchart showing the operation of a controller of the robot system according to this embodiment.

The control unit 21 transmits, to the servo controllers 24 and 25, control commands for performing predetermined work on the object O according to these programs. As a result, the robot 10 and the hand 30 perform the predetermined work on the object O. Example processing performed by the control unit 21 at this time will be described with reference to the flowchart in FIG. 4. Note that following control described below may be performed by another processing.

First, according to the following program 23c, the control unit 21 obtains, from the detecting device 40, image data in which an image of the object O is captured (step S1-1). When the detecting device 40 has a processing unit for detecting the position and the orientation of the object O from the image data, the control unit 21 may obtain the position and the orientation of the object O from the detecting device 40 in step S1-1.

The control unit 21 sets a following coordinate system that moves together with the object O on the transfer device 2, using a detection value obtained by the movement-amount detecting device 50 when the detecting device 40 captures the image data and using a current detection value obtained by the movement-amount detecting device 50 (step S1-2).

Figure 5:
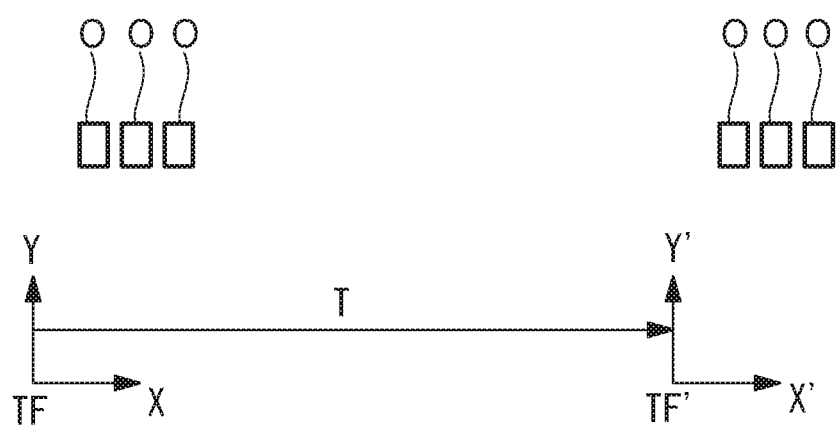
FIG. 5 is a diagram for explaining a coordinate system for following control in the robot system according to this embodiment.

FIG. 5 shows an example following coordinate system. TF represents the following coordinate system at the moment when the detecting device 40 captures the image data of the object O. For example, the following coordinate system TF has information about the position and the orientation of the object. TF' represents the current following coordinate system. As shown in FIG. 5, the present following coordinate system TF' also has information about the position and the orientation of the object O. In other words, the object O has the same information about the position and the orientation with respect to both of the following coordinate systems TF and TF'.

As shown in Expression (1) below, the following coordinate system TF' is obtained by using a coordinate transformation matrix T.

$$TF' = T \cdot TF \quad (1)$$

The movement component can be obtained by using, for example, Expression (2) below.

$$(e2 - e1)/S \quad (2)$$

Specifically, the difference between the position of the object O detected in the following coordinate system TF and the current position of the object O is sequentially calculated.

Here, in Expression (2), e1 is the detection value obtained by the movement-amount detecting device 50 when the detecting device 40 captures the image data, and e2 is the current detection value obtained by the movement-amount detecting device 50.

Here, S is the ratio of the count obtained by the movement-amount detecting device 50 to the amount by which the transfer device 2 moves the object O. More specifically, when S is 1, the detection result obtained by the movement-amount detecting device 50 is the amount by which the transfer device 2 moves the object O.

Next, the control unit 21 starts to transmit control commands to the robot 10 and the hand 30 according to the operating program 23b (step S1-3). As a result, the hand 30 picks a part 110 in a state in which following control for causing the hand 30 of the robot 10 to follow the object O is performed.

To perform the following control, in step S1-3, the control unit 21 uses the following coordinate system TF', set in step S1-2, as a reference coordinate system of the robot 10, which operates according to the operating program 23b. Hence, the reference coordinate system of the robot 10 moves in the transfer direction of the transfer device 2, and the movement of the reference coordinate system is consistent with the movement of the object O moved by the transfer device 2. In this situation, although the object O is moved by the transfer device 2, from the perspective of the control unit 21, the object O stops within the reference coordinate system. Thus, the control unit 21 can cause the distal end of the robot 10 to stably follow the object O.

While this following control is performed, the control unit 21 determines, according to the movement-amount-abnormality response program 23d, whether the speed calculated on the basis of the detection result obtained by the movement-amount detecting device 50 is within a predetermined reference 23e (step S1-4). It is also possible to determine whether the acceleration or the jerk, instead of the speed, is within the reference 23e. The speed, the acceleration, and the jerk are calculated by using the amount of rotation, the rotation speed, the diameter, and the like of the roller 51 of the movement-amount detecting device 50.

The reference 23e is different from an upper-limit limiter 23f of the speed, the acceleration, the jerk, or the like of the robot 10. In other words, the upper-limit limiter 23f and the reference 23e are stored in the storage unit 23 of the robot controller 20. When the robot 10 operates at a speed, acceleration, jerk, or the like exceeding the upper-limit limiter 23f, the robot controller 20 issues a predetermined warning, stops the operation of the robot 10, or does something else. In step S1-4, in addition to the above-described processing based on the upper-limit limiter 23f, the robot controller 20 performs the above-described determination.

In an example, the speed calculated on the basis of the detection result obtained by the movement-amount detecting device 50 fluctuates due to poor contact between the roller 51 of the movement-amount detecting device 50 and the transfer device 2. For example, when the roller 51 is intermittently in contact with the transfer device 2, the speed fluctuates, and the acceleration and the jerk also fluctuate. Furthermore, the detection result obtained by the movement-amount detecting device 50 is intermittently transmitted to the robot controller 20 due to poor contact inside the movement-amount detecting device 50, poor contact between the movement-amount detecting device 50 and the robot controller 20, or the like. Also in this case, the speed calculated on the basis of the detection result obtained by the movement-amount detecting device 50 fluctuates, and the acceleration and the jerk also fluctuate. In the description below, the speed, the acceleration, and the jerk calculated on the basis of the detection result obtained by the movement-amount detecting device 50 may be simply referred to as the speed, the acceleration, and the jerk.

Figure 6:
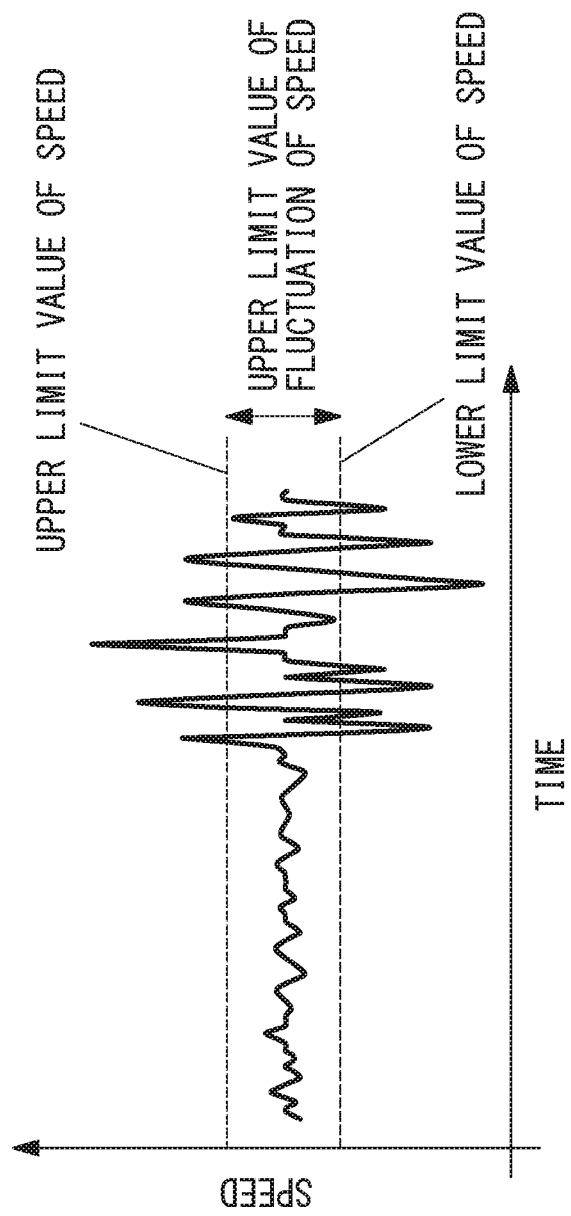
FIG. 6 shows an example time chart of speed based on a detection result obtained by a movement-amount detecting device according to this embodiment.

In an example, the reference 23e can be an upper limit value of the speed, a lower limit value of the speed, an upper limit value of the acceleration, a lower limit value of the acceleration, an upper limit value of the jerk, or a lower limit value of the jerk. In another example, the reference 23e can be a fluctuation pattern of the speed, the acceleration, or the jerk. For example, an upper limit value of the amount of fluctuation of the speed, the acceleration, or the jerk can be used as the pattern. For example, as shown in FIG. 6, the fluctuation of the speed suddenly increases from a point in time and deviates from the upper limit value or the lower limit value of the speed or from the upper limit value of the amount of fluctuation of the speed, serving as the reference 23e.

When it is determined that the value or the pattern of any one of the speed, the acceleration, and the jerk calculated according to the movement-amount-abnormality response program 23d in step S1-4 deviates from the reference 23e, the control unit 21 performs predetermined reporting (step S1-5). Examples of the predetermined reporting include giving an indication to the effect that there is an abnormality in the detection result obtained by the movement-amount detecting device 50, using the display unit 22 or the display unit 26a, and outputting something to the effect that there is an abnormality, by using a predetermined voice output device. Other examples of the predetermined reporting include giving an indication, using the display unit 22 or the display unit 26a, of a time chart of the speed, the acceleration, or the jerk calculated on the basis of the detection result obtained by the movement-amount detecting device 50, as shown in FIG. 6. Text, the screen color, a predetermined diagram, or the like can be used as the indication using the display unit 22 or the display unit 26a.

Other examples of the predetermined reporting include giving an indication, using the display unit 22 or the display unit 26a, of scattered data showing the previous speed, acceleration, or jerk and the current speed, acceleration, or jerk. For example, a bar chart, a line chart, or the like showing the amounts of fluctuation of the speed at a plurality of points in time in the past and showing the current amount of fluctuation of the speed can be used as the scattered data.

Note that, in step S1-5, together with or instead of the predetermined reporting, the control unit 21 may cause the robot 10 to perform a danger avoidance operation. The danger avoidance operation is, for example, stopping the robot 10, moving the robot 10 to a stand-by position, reducing the operation speed of the robot 10, or the like.

Normally, the robot controller 20 continues following control of the robot 10 according to the detection result obtained by the movement-amount detecting device 50 if the speed, the acceleration, or the jerk is within the upper-limit limiter 23f. Hence, even when the roller 51 of the movement-amount detecting device 50 and the transfer device 2 are intermittently in contact with each other, the robot controller 20 continues following control. In this case, the robot 10 moves at a speed according to the detection result obtained by the movement-amount detecting device 50, which may look as if the robot 10 is performing an abnormal operation.

In this embodiment, when the value or the pattern of any one of the speed, the acceleration, and the jerk of the object O calculated on the basis of the detection result obtained by the movement-amount detecting device 50 deviates from the predetermined reference 23e, the robot controller 20 displays a predetermined indication on the display unit 22 or the display unit 26a. In other words, when there is an abnormality in the detection result obtained by the movement-amount detecting device 50 while following control of the robot 10 is continued, the predetermined indication appears on the display unit 22 or the display unit 26a. This configuration is advantageous in reliably identifying the cause of the abnormality at an early stage. More specifically, this configuration is advantageous in reliably recognizing that there is no abnormality in the robot 10 at an early stage.

The reference 23e may be either set by a user by using the input unit 26 or automatically set by the robot controller 20. For example, the robot controller 20 calculates the upper limit speed and the lower limit speed on the basis of the variance or the mean of the transfer speeds of the transfer device 2 at a normal time and automatically sets the upper limit speed and the lower limit speed as the reference 23e. In another example, the robot controller 20 automatically sets, as the reference 23e, the upper limit speed, which is the value obtained by adding a predetermined value to the current transfer speed of the transfer device 2, and the lower limit speed, which is the value obtained by subtracting a predetermined value from the current transfer speed. In another example, the robot controller 20 calculates the allowable value of the speed, the acceleration, or the jerk from the previous amount of fluctuation of the speed, the acceleration, or the jerk, and sets this allowable value as the reference 23e. When the reference 23e is automatically set like this, the determination in step S1-4 and the predetermined reporting in step S1-5 are more appropriately performed.

Furthermore, in this embodiment, the robot controller 20 may accumulate, in the storage unit 23, detection-result related data, such as the detection result obtained by the movement-amount detecting device 50, the value of the speed, the acceleration, or the jerk, the amounts of fluctuation thereof, and the time charts thereof. The robot controller 20 may give an indication based on the accumulated detection-result related data on the display unit 22 or the display unit 26a in response to the input to the input unit 26 or the like. For example, a button requesting a time chart, a button requesting scattered data, a button for specifying the time range to be displayed, etc. are shown on the input unit 26, and the time chart, the scattered data, or the like is indicated on the basis of the input to the input unit 26. The indication of the accumulated information in response to the user's request like this is advantageous in finding an abnormality, identifying the cause of the abnormality, or the like.

The amount of movement of a mark on the transfer device 2, the object O, or the like may be detected on the basis of image data obtained by an image capturing device that captures an image of the top surface of the transfer device 2. The detection of the amount of movement on the basis of the image data may be performed by the control unit 21 of the robot controller 20. In this case, the image capturing device and the control unit 21 serve as the movement-amount detecting device.

Instead of the transfer device 2, another robot or an automated guided vehicle (AGV) may move the object O. Also in this case, the same advantageous effect as above is obtained if it is possible to obtain the detection result showing the amount of movement of the object O on the basis of a control command for operating the other robot or the amount of rotation of the wheels of the AGV.

In the embodiment above, the robot controller 20 may have a learning function. For example, the storage unit 23 may store a learning program (learning unit) 23g, and the control unit 21 may learn according to the learning program 23g.

For example, the control unit 21 generates, by using learning information, a table or an expression that associates the type of the transfer device 2, the transfer speed, the type of the movement-amount detecting device 50, the type of the object O, the number of objects O, etc., with the reference 23e, and stores the thus-generated table or expression in the storage unit 23. This generation of the table or the expression is achieved by learning for enabling reliable detection of an abnormality at an early stage.

The data in which the amount of fluctuation of the speed, the acceleration, or the jerk calculated on the basis of the detection result obtained by the movement-amount detecting device 50 is associated with the type of the transfer device 2 can be used as the learning information. The data in which the type of the object O or the number of objects O is associated with the amount of fluctuation of the speed, the acceleration, or the jerk can also be used as the learning information. The data in which the type of the movement-amount detecting device 50 is associated with the amount of fluctuation of the speed, the acceleration, or the jerk can also be used as the learning information. The data in which the amount of fluctuation of the speed, the acceleration, or the jerk is associated with the result of a visual check of the operation of the robot 10 can also be used as the learning information. The result of a visual check can be the score obtained by evaluating, at multiple levels, the state of the robot 10 that operates with various amounts of fluctuation of the speed, the acceleration, or the jerk.

As a result of the robot controller 20 performing learning like this, the robot controller 20 can set a more appropriate reference 23e.

Figure 7:
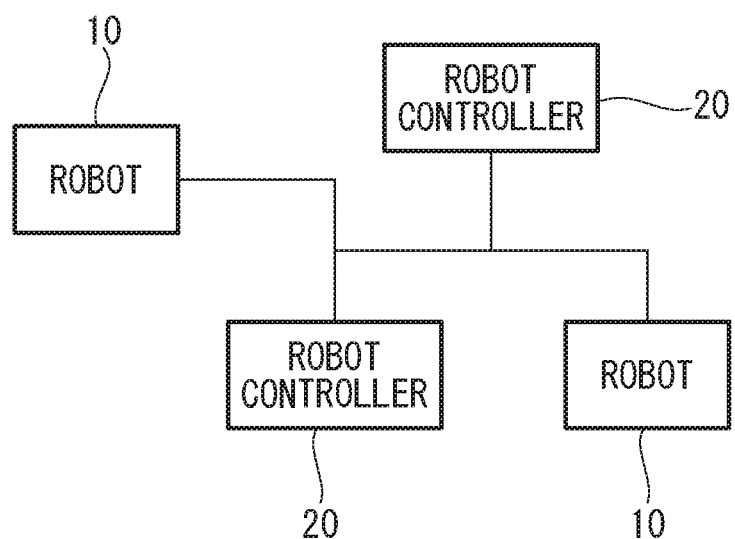
FIG. 7 schematically shows the configuration of a first modification of the robot system according to this embodiment.

As shown in FIG. 7, the robot controller 20 may be connected to another robot controller 20. In this case, the table or the expression obtained by the learning as described above may be transmitted to the other robot controller 20, together with necessary information, by a wireless or wired transmitting/receiving unit 27 of the robot controller 20. The necessary information includes the specifications of the robot 10 and the transfer device 2, the specifications of the movement-amount detecting device 50, the specifications of the hand 30, and the information of the object O relevant to generation of the table or the expression. The other robot controller 20 also transmits the learning result to the robot controller 20.

The robot controller 20 and the other robot controller 20 can use the received table or expression for following control. The robot controller 20 and the other robot controller 20 can use the received table or expression as the learning information.

Figure 8:
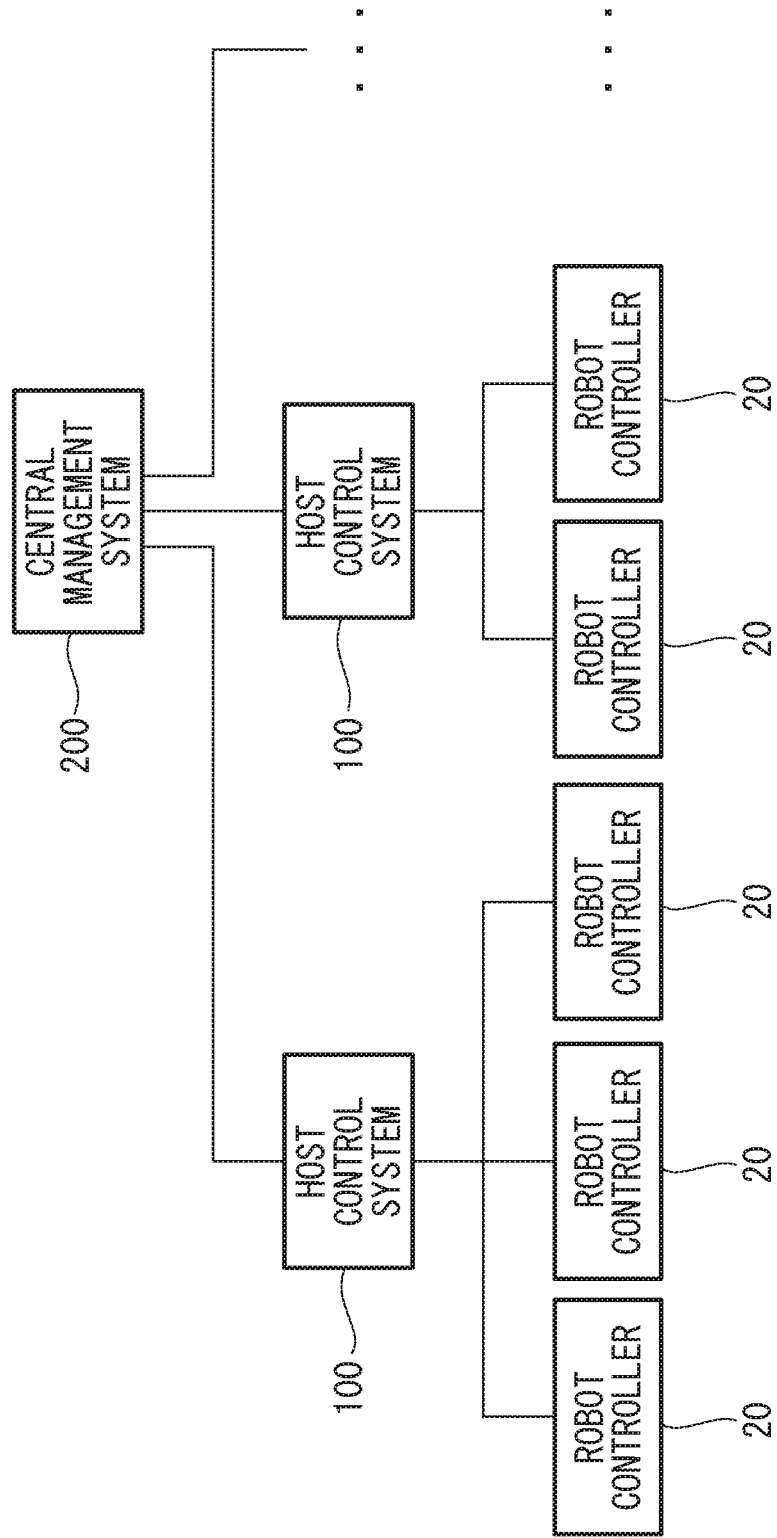
FIG. 8 schematically shows the configuration of a second modification of the robot system according to this embodiment.

As shown in FIG. 8, a plurality of robot controllers 20 may be connected to a host control system 100. Examples of the host control system 100 include a production management system, a delivery management system, a robot management system, and a department management system. A plurality of host control systems may be connected to a central management system 200 or the like, which is another host control system. The plurality of robot controllers 20 and the host control system constitute the management system.

The host control system 100 and the central management system 200 each include: a control unit having a processor and the like; a display unit; a storage unit having a non-volatile storage, a ROM, a RAM, and the like; and an input device such as a keyboard, a touch panel, or a control panel.

The table or the expression obtained by learning may be sent from the robot controller 20 to the host control system 100 or the central management system 200, together with the necessary information. The necessary information includes the specifications of the robot 10 and the transfer device 2, the specifications of the movement-amount detecting device 50, the specifications of the hand 30, and the information about the object O relevant to generation of the table or the expression.

The host control system 100 or the central management system 200 can perform learning using a plurality of tables or expressions relevant to the specifications of the same or same type of robots 10, the same type of movement-amount detecting devices 50, and the same type of transfer devices 2 to form a new table or expression.

The host control system 100 or the central management system 200 transmits the generated table or expression to the robot controller 20.

The robot controller 20 can use the received table or expression for following control. The other robot controller 20 can use the received table or expression as the learning information, when this robot controller 20 performs learning.

The robot controller 20, the host control system 100, or the central management system 200 can transmit the generated table or expression to a robot controller having no learning function. This makes it easy to identify the cause of an abnormality or to perform other operations during following control performed by the robot controller having no learning function and by the robot hand thereof.

The invention claimed is:

1. A robot controller that is configured to cause a robot to follow a target, while a transfer device is moving the target, by using a detection result obtained by a movement-amount detecting device that detects an amount by which the transfer device moves the target, the robot controller comprising a storage unit that stores an upper limit and a lower limit for at least one of a speed, an acceleration, and a jerk of the target calculated based on the detection result obtained by the movement-amount detecting device, wherein the robot controller performs predetermined reporting, stops the robot, or moves the robot to a stand-by position when the at least one of the speed, the acceleration, and the jerk exceeds one of the upper limit and the lower limit immediately after the at least one of the speed, the acceleration, and the jerk exceeds the other of the upper limit and the lower limit, and wherein the upper limit and the lower limit are calculated based on the speed, the acceleration, or the jerk during operation of the robot or the upper limit and the lower limit are set by a user.

\* \* \* \* \*